3,028,395
PROCESS FOR THE RESOLUTION OF
OPTICALLY ACTIVE ACIDS
James M. Gillingham, Royal Oak, Mich., assignor to Parke, Davis & Company, Detroit, Mich., a corporation of Michigan
No Drawing. Filed Mar. 28, 1955, Ser. No. 497,409
8 Claims. (Cl. 260—319)

This invention relates to a process for the production of optical isomers of alpha N-acyl amino acids. More particularly, this invention relates to a process for the resolution of alpha N-acyl amino acids employing an optical isomer of amphetamine as a resolving agent.

Heretofore, in the resolution of N-acyl amino acids there have been employed as resolving agents various alkaloidal materials such as quinine, strychnine, brucine and the like as well as optically active acids such as $d$-camphor sulfonic acid. These materials have proved to be unsatisfactory for large-scale application by reason of their high cost. Moreover, the methods employing these agents have in general involved unduly prolonged handling, requiring several fractional crystallizations in order to obtain the desired individual optical antipodes. Despite these disadvantages there has in the past been no more satisfactory method of resolving amino acids.

I have now developed a new method which surprisingly eliminates the disadvantages mentioned and makes it possible to resolve large quantities of N-acyl amino acids economically and in good yield.

In accordance with the invention the individual optical isomers are produced by forming a solution of a racemic N-acyl alpha amino acid and an optical isomer of amphetamine in a hydroxylic solvent at elevated temperature, cooling the solution to provide a liquid phase containing an optical isomer of said N-acyl amino acid and a solid phase consisting of the amphetamine salt of the opposite optical isomer of said N-acyl amino acid, separating the phases, and isolating the isomers from the separate phases. The process is particularly advantageous in that a high yield of relatively pure optical isomers is obtained in one or two cycles without the need for further processing. Another advantage is that there is a high recovery of resolving agent.

The invention is applicable broadly to any racemic N-acyl alpha amino acid, particularly the N-acyl derivatives of the commonly known alpha amino acids. As a specific illustration of these, there can be mentioned the N-acyl amino acids which are derivable from the mono-amino dicarboxylic acids such as aspartic and glutamic acids, the monoamino monocarboxylic acids such as $\alpha$-alanine, valine, leucine, isoleucine, phenylalanine, serine, threonine, cysteine, methionine, tryptophan and tyrosine, and the basic amino acids such as lysine. The term "acyl" represents a carboxylic acid acyl group and includes aliphatic acyl groups such as formyl, acetyl, dichloroacetyl, propionyl, methoxyacetyl and the like; aryl acyl groups such as benzoyl, substituted benzoyl and the like; and araliphatic acyl groups such as phenylacetyl, carbobenzoxy and the like.

Either the $d$- or the $l$-isomer of amphetamine can be employed as a resolving agent. However, for reasons of economy and ease of handling it will be preferable to employ the physiologically inactive $l$-isomer.

It will be understood that there are various satisfactory ways of forming the solution of the N-acyl amino acid and amphetamine optical isomer. The choice of solvent itself is subject to considerable variation and in any given case will depend to some extent on the nature of the particular amino acid. In general, a hydroxylic solvent such as water, alcohol or aqueous alcohol, will be satisfactory. In some cases it is preferable to employ water alone while in other cases an aqueous alcoholic solvent or an anhydrous alcohol will be preferable. As an illustration of this, water is conveniently employed as a solvent in the resolution of $dl$-acetylvaline and 95% aqueous alcohol in the resolution of $dl$-acetylmethionine. Alcohols which boil at relatively low temperatures, i.e. below 120° C. are preferred, particularly methanol and ethanol. The solvent is imployed in an amount sufficient to maintain the N-acyl amino acid and resolving agent in solution at elevated temperature, i.e. a temperature higher than room temperature, but insufficient to maintain the solids in solution during the cooling step. In practice the amount employed will generally be within the range from about 0.4 to 4 liters for each mole of N-acyl alpha amino acid present.

The usual manner of forming the solution involves first dissolving or suspending the N-acyl amino acid in the solvent with heating if necessary and then adding the resolving agent to the mixture. When added, the resolving agent reacts with the N-acyl amino acid to form an acid addition salt and the resulting heat of reaction facilitates the dissolution of any remaining undissolved solids. Conveniently, the temperature of the solution prior to addition of resolving agent can be brought to within 10 to 15° below the boiling point so that the addition of the resolving agent will cause the mixture to boil moderately.

There are various other satisfactory methods of forming the desired solution. For instance, it will be satisfactory to dissolve the materials simultaneously by heating together in the solvent or by combining separate solutions of the same. It will also be satisfactory to reverse the order of addition so that the N-acyl amino acid is added to a solution containing the resolving agent.

The proportion of resolving agent employed in the process may be varied considerably. For best results, one equivalent of resolving agent is employed for each mole of N-acyl amino acid. However, in some cases one-half equivalent of resolving agent can be employed in which event the N-acyl amino acid and resolving agent react selectively to form the amphetamine salt of one of the optical isomers, leaving the opposite isomer as the free acid. Thus, the resolving agent exists in the solution in acid addition salt form with one of the optical isomers thereby exhausting the solution of resolving agent in the free base form. Larger proportions of the resolving agent can be employed if desired but there is no particular advantage in employing the agent in a proportion greater than about one equivalent for each mole of N-acyl amino acid present.

After complete solution of the solid is attained, the solution is allowed to cool preferably with continuous agitation or stirring until the acid addition salt of the N-acyl amino acid isomer separates or crystallizes out. This usually requires about 5 to 24 hours when allowed to stand at room temperature. It is an unexpected and desirable feature of the process that agitation or stirring of the resolution liquor has no substantial effect on the desired selective cropping out or crystallization of the salt of only one of the individual optical isomers. Ordinarily, it would be expected that agitation and vigorous stirring would cause both of the isomers to separate alike. In view of the highly selective character of the process in this respect, it is advantageous to stir or agitate the solution in order to assure the formation of fine crystals and to prevent or minimize the potential occlusion or carrying down of the dissolved isomer in the precipitating crystals of the salt of the opposite isomer. The process is particularly applicable to large-scale operation since it has been found that precipitation or crystallization is induced more readily with large batches. A further advantage of the process is that seeding is ordinarily not required to initiate the desired crystallization.

In the resolution of many N-acyl amino acids employing *l*-amphetamine as a resolving agent, I have found that the solid or crystalline phase consists solely of the *l*-form of the N-acyl amino acid, thereby leaving the *d*-form in the liquid phase. For example, in the resolution of *dl*-N-acetylserine employing *l*-amphetamine, the solid phase consists solely of the *l*-amphetamine salt of *l*-N-acetylserine. However, in some instances the reverse is true in which case only the *d*-form is present, thereby leaving the *l*-form in the liquid phase. For example, in the resolution of *dl*-N-acetylmethionine employing *l*-amphetamine, the precipitate consists of the *l*-amphetamine salt of *dl*-N-acetylmethionine. It will be understood that the designations "*d*" and "*l*" used in referring to the N-acyl amino acid isomer indicate the direction of optical rotation and are not necessarily related to the absolute stereochemical configuration of the isomer.

After crystallization is complete, the crystals are removed from the mother liquor conveniently by filtration, and the separate crystalline and liquid phases so obtained are processed as desired for the recovery of the separate N-acyl amino acid isomers. In a case where the isomer is present as the free acid, isolation can be satisfactorily accomplished by removing the solvent and, if desired, purifying the residual free acid by recrystallization from water or other suitable means. Where the isomer is present as the amphetamine salt, isolation can be accomplished by basifying an aqueous solution of the salt to cause separation of the amphetamine, extracting the amphetamine with a water-immiscible organic solvent such as ether, acidifying the residual solution, and recovering the N-acyl amino acid isomer present by crystallization and separation of the crystalline product. Alternatively, the desired isomer can be isolated from the residual solution obtained after extraction of the amphetamine by subjecting the solution to ion exchange, preferably employing a cationic exchanger in the acid form, and concentrating the resulting effluent and recovering the crystalline product. The desired isomer can also be isolated by subjecting an aqueous solution of the amphetamine salt to ion exchange employing a cationic exchanger in the acid form, and concentrating the resulting effluent and recovering the crystalline product. It will be understood that in a case where only one particular optical isomer of the N-acyl amino acid is desired, it will suffice following the separation of the two phases, to further process only the phase containing it.

The optical isomers obtained by the process of the invention can be readily converted by acid hydrolysis to the corresponding alpha amino acids. As is known, many of these acids are essential to human nutrition.

The invention is illustrated by the following examples which show the use, as a solvent, of water, alkanols which boil below 120° C. and aqueous solutions of alkanols which boil below 120° C.; also shown is the resolution of racemic N-acyl amino acids in which the acyl group, i.e., the carboxylic acid acyl group, is a lower aliphatic acyl group, a benzoyl group or a carbobenzoxy group.

*Example 1*

13.1 g. of *dl*-N-acetylalanine and 13.5 g. of *l*-amphetamine are dissolved with heating in 125 ml. of 95% ethanol. The solution is allowed to stand at room temperature for 16–18 hours during which time a feathery precipitate is formed. The precipitate consisting of the *l*-amphetamine salt of *l*-N-acetylalanine is removed by filtration and recrystallized from 95% ethanol;

$$[\alpha]_D^{25} = -33°$$

(2% in water). The recrystallized material is dissolved in water and passed through an ion exchange column containing a sulfonate resin in the acid form (Dowex 50). The effluent is concentrated to dryness. After recrystallization from water the product, *l*-N-acetylalanine, has an optical rotation, $[\alpha]_D^{25}$, of $-66.2°$ (2% in water).

The filtrate obtained above is concentrated and cooled, and the resulting crystalline *l*-amphetamine salt of *d*-N-acetylalanine is separated by filtration and dissolved in water. The solution is subjected to ion exchange and the effluent is treated in the same manner as the salt of the *l*-isomer to obtain *d*-N-acetylalanine.

*Example 2*

1.57 g. of *dl*-N-acetylvaline and 1.35 g. of *l*-amphetamine are dissolved with heating in 20 ml. of water. The solution is allowed to stand for 16 to 20 hours at room temperature and the resulting crystalline precipitate consisting of the *l*-amphetamine salt of *l*-N-acetylvaline is removed by filtration; $[\alpha]_D^{25} = -14°$ (1.37% in water). The crystalline product is dissolved in water and the solution is passed through an ion exchange column containing a sulfonate resin in the acid form (Dowex 50). The effluent is concentrated until crystals begin to form and is then cooled. The resulting crystalline product consisting of *l*-N-acetylvaline is filtered off and dried; $[\alpha]_D^{25} = -4°$ (2% in ethanol).

The filtrate first obtained above is made alkaline with dilute aqueous sodium hydroxide solution and extracted with several portions of ether. The residual solution is then concentrated and acidified to obtain the crystalline product, *d*-N-acetylvaline; $[\alpha]_D^{25} = +4°$ (2% in ethanol) after recrystallization from water.

*Example 3*

441 g. of *dl*-N-acetylserine and 405 g. of *l*-amphetamine are dissolved with heating and stirring in 2800 ml. of 95% ethanol. Stirring is continued for 16 to 20 hours at 23–25° C. The crystals which have formed are then filtered and dried. The crystalline material consisting of the *l*-amphetamine salt of *l*-N-acetylserine is dissolved in water and the solution is passed through an ion exchange column containing a sulfonate resin (Dowex 50, acid form). The effluent is concentrated and cooled, and the resulting crystalline product, *l*-N-acetylserine, is filtered off and dried; $[\alpha]_D^{28} = -21.9°$ (2% in absolute ethanol).

The filtrate first obtained above is reduced to dryness in vacuo. Two equivalents of 20% sodium hydroxide solution are added to the residue and the *l*-amphetamine is extracted with toluene. The residue is taken up in water and the aqueous solution is passed through an ion exchanger containing a sulfonic acid resin (Dowex 50, acid form) to remove the sodium ions. The effluent is concentrated to 250–300 ml., seeded with *d*-N-acetylserine crystals and allowed to stand overnight at room temperature. The resulting crystalline product, *d*-N-acetylserine, is separated by filtration and is dried; $[\alpha]_D^{25} = +23.25°$ (2% in absolute alcohol).

*Example 4*

10.3 g. of *dl*-N-acetylphenylalanine is dissolved with heating in 250 ml. of 95% ethanol. 6.75 g. of *l*-amphetamine is added, and the solution is allowed to stand for 16 to 20 hours at room temperature. The resulting crystalline precipitate consisting of the *l*-amphetamine salt of *l*-N-acetylphenylalanine is filtered off and dried; $[\alpha]_D^{25} = -50°$ (2.5% in water). The crystalline material is dissolved in water and the aqueous solution is passed through a sulfonic acid ion exchanger (Dowex 50), and the effluent is evaporated to dryness. The product is *l*-N-acetylphenylalanine; $[\alpha]_D^{25} = -48.5°$ (1.5% in absolute alcohol).

The filtrate first obtained above is allowed to evaporate slowly at room temperature. The crystalline product which forms, consisting of the *l*-amphetamine salt of *d*-N-acetylphenylalanine, is filtered off and dried. The crystals are dissolved in water and the aqueous solution is passed through a sulfonic acid ion exchanger (Dowex 50). The effluent is evaporated to dryness to obtain the product, $d$-N-acetylphenylalanine; $[\alpha]_D^{25} = +51°$ (1.5% in absolute ethanol).

*Example 5*

19.1 g. of $dl$-N-acetylmethionine and 13.5 g. of $l$-amphetamine are dissolved with heating in 125 ml. of 95% ethanol. The solution is allowed to cool slowly for 16 hours, and the crystalline product consisting of the $l$-amphetamine salt of $d$-N-acetylmethionine is filtered off and dried; $[\alpha]_D^{25} = -17.3°$ (2% in water). The crystalline salt is dissolved in water and the solution is passed through a sulfonic acid ion exchanger (Dowex 50). The effluent is concentrated in vacuo and cooled to obtain the product, $d$-N-acetylmethionine; $[\alpha]_D^{25} = +20.1°$ (2% in water) after recrystallization from water.

$l$-N-acetylmethionine is obtained from the alcoholic filtrate described above by removing the alcohol and then treating the resulting residual product, $l$-amphetamine salt of $l$-N-acetylmethionine, in the same manner as described above for the recovery of the corresponding salt of the $d$-isomer.

*Example 6*

21 g. of $dl$-N-benzoylserine and 1.4 g. of $l$-amphetamine are dissolved with warming in 7 ml. of water. The solution is allowed to stand for 16 hours and the crystals which form are removed by filtration and dried. The crystalline material consisting of the $l$-amphetamine salt of $l$-N-benzoylserine having an optical rotation, $[\alpha]_D^{26} = -19.8°$ (0.5% in water) after recrystallization from water, is dissolved in water, extracted with small portions of ether and passed through an ion exchanger (Dowex 50 resin, acid form). The effluent is evaporated to dryness in vacuo and the residual product is recrystallized from water. The product is $l$-N-benzoylserine; $[\alpha]_D^{26} = -37°$ (0.5% in ethanol).

$d$-N-benzoylserine is obtained from the filtrate described above by extracting with ether and treating the residual solution in the same manner as described above for the recovery of the corresponding $l$-isomer. The resulting $d$-N-benzoylserine has an optical rotation, $[\alpha]_D^{26}$, of $+46°$ (2% in ethanol).

*Example 7*

4.8 g. of $dl$-N-carbobenzoxyserine is dissolved in 50 ml. of 50% ethanol at 50° C. and 2.7 g. of $l$-amphetamine is added. The resulting solution is allowed to stand for 16 to 20 hours at room temperature. The crystals which form consisting of the $l$-amphetamine salt of $d$-N-carbobenzoxyserine are separated by filtration; $[\alpha]_D^{26} = +5.5°$ (1% in dimethylformamide). 1.5 g. of the crystals is dissolved in 8 ml. of 50% ethanol and the solution is passed through a sulfonic acid ion exchanger (Dowex 50, acid form). The effluent is concentrated to dryness in vacuo to obtain $d$-N-carbobenzoxyserine; $[\alpha]_D^{26} = +5.5°$ (1% in acetic acid).

The alcoholic filtrate obtained as described above is passed through an ion exchanger in the same manner as indicated above and the resulting effluent is concentrated to obtain $l$-N-carbobenzoxyserine; $[\alpha]_D^{26} = -5.5°$ (1% in acetic acid).

*Example 8*

24.5 g. of $dl$-N-acetyltryptophan and 13.5 g. of $l$-amphetamine are dissolved with heating in 200 ml. of 95% ethanol, and the solution is allowed to stand for 16 hours at room temperature. The crystals which separate consisting of the $l$-amphetamine salt of $l$-N-acetyltryptophan are collected by filtration and dried; $[\alpha]_D^{26} = -23.9°$ (0.5% in ethanol). The crystalline salt is dissolved in water, made alkaline with dilute sodium hydroxide solution, and extracted with small portions of ether. The residual solution is concentrated, acified with dilute hydrochloric acid and allowed to stand overnight with cooling. The resulting crystalline product is isolated by filtration and is dried. The product, $l$-N-acetyltryptophan, has an optical rotation, $[\alpha]_D^{26}$, of $-25°$ (2% in ethanol).

The alcoholic filtrate obtained as described above is concentrated to dryness in vacuo, the residual salt is dissolved in water, and the aqueous solution is subjected to ion exchange and concentration in the same manner as described above. The opposite isomer, $d$-N-acetyltryptophan, is obtained; $[\alpha]_D^{26} = +25°$ (2% in ethanol).

*Example 9*

1.89 g. of $dl$-N-acetylglutamic acid and $l$-amphetamine are dissolved in a mixture of 45 ml. of isopropanol and 5 ml. of water with heating and the solution is allowed to stand for 16 hours at 23–25° C. The crop of $l$-amphetamine salt of $l$-N-acetylglutamic acid which forms is filtered off and dried in vacuo; $[\alpha]_D^{26} = -2.7°$ (1.8% in water). An aqueous solution of the crystalline material is passed through a sulfonic acid ion exchanger (Dowex 50, acid form) and the effluent is concentrated to dryness to obtain $l$-N-acetylglutamic acid.

The alcoholic filtrate is concentrated to about 25 ml. with heating to obtain crystalline $l$-amphetamine salt of $d$-N-acetylglutamic acid. The crystals are separated and dissolved in water and the solution is made alkaline with dilute sodium hydroxide solution. The amphetamine is extracted with toluene and the residual solution is concentrated, cooled and acidified to obtain the opposite isomer, $d$-N-acetylglutamic acid.

*Example 10*

2.2 g. of $dl$-N-acetyltyrosine and 1.7 g. of $l$-amphetamine are dissolved in 50 ml. of absolute alcohol with heating. The solution is allowed to stand for 18 to 20 hours at room temperature and the crop of $l$-amphetamine salt of $l$-N-acetyltyrosine is removed by filtration; $[\alpha]_D^{26} = +40.25°$ (2% in water). The crystals are dissolved in water, the solution is made alkaline with dilute sodium hydroxide solution and is extracted with ether. The residual solution is passed through a sulfonic acid ion exchanger (Dowex 50, acid form) and the effluent is concentrated to dryness to obtain $l$-N-acetyltyrosine.

The alcoholic filtrate is taken to dryness in vacuo and the residue is dissolved in water. The aqueous solution is subjected to ion exchange and the effluent is concentrated in the same manner described for the recovery of the $l$-isomer. The product is $d$-N-acetyltyrosine.

*Example 11*

4.8 g. of $dl$-N-carbobenzoxyserine is dissolved in 25 ml. of 95% ethanol at 50° C. and 1.35 g. of $l$-amphetamine is added. The solution is allowed to stand for 16 to 20 hours at room temperature, and the crop of $l$-amphetamide salt of $d$-N-carbobenzoxyserine which separates is collected by filtration. The crystals are dissolved in 8 ml. of 50% ethanol and the solution is passed through a sulfonic ion exchanger (Dowex 50, acid form). The effluent is concentrated to obtain $d$-N-carbobenzoxyserine; $[\alpha]_D^{26} = +5.5°$ (1% in acetic acid).

The alcoholic filtrate is evaporated to dryness to obtain the opposite isomer, $l$-N-carbobenzoxyserine.

I claim:
1. Process for the production of optical isomers of alpha N-acyl amino carboxylic acids which comprises forming a solution of a racemic alpha N-acyl amino carboxylic acid and an optical isomer of amphetamine in a solvent selected from the class consisting of water, alkanols which boil below 120° C. and aqueous solutions of alkanols which boil below 120° C. at elevated temperature, cooling the solution to provide a liquid phase containing an optical isomer of said N-acyl amino carboxylic acid and a solid phase consisting of the amphetamine salt of the opposite isomer of said N-acyl amino carboxylic acid, separating the phases, and isolating the optical isomers of said N-acyl amino carboxylic acid from the separate phases, said acyl being a carboxylic acid acyl group selected from the class consisting of unsubstituted lower aliphatic acyl, chloro-substituted lower aliphatic acyl, methoxy-substituted lower aliphatic acyl, benzoyl and carbobenzoxy.

2. Process for the production of optical isomers of alpha N-acyl amino carboxylic acids which comprises forming a solution of a racemic alpha N-acyl amino carboxylic acid and an optical isomer of amphetamine in a solvent selected from the class consisting of water, alkanols which boil below 120° C. and aqueous solutions of alkanols which boil below 120° C. at elevated temperature, cooling the solution to provide a liquid phase containing an optical isomer of said N-acyl amino carboxylic acid and a solid phase consisting of the amphetamine salt of the opposite isomer of said N-acyl amino carboxylic acid, separating the phases, and isolating the optical isomer of said N-acyl amino carboxylic acid from at least one of said separate phases, said acyl being a carboxylic acid acyl group selected from the class consisting of unsubstituted lower aliphatic acyl, chloro-substituted lower aliphatic acyl, methoxy-substituted lower aliphatic acyl, benzoyl and carbobenzoxy.

3. Process according to claim 2 wherein one-half equivalent of amphetamine is employed for each mole of alpha N-acyl amino carboxylic acid present in said solution.

4. Process according to claim 1 wherein the racemic alpha N-acyl amino carboxylic acid is $dl$-N-acetylserine.

5. Process according to claim 1 wherein the racemic alpha N-acyl amino carboxylic acid is $dl$-N-acetylvaline.

6. Process according to claim 1 wherein the racemic alpha N-acyl amino carboxylic acid is $dl$-N-acetylmethionine.

7. Process according to claim 1 wherein the racemic alpha N-acyl amino carboxylic acid is $dl$-N-acetyltryptophan.

8. Process according to claim 1 wherein the racemic alpha N-acyl amino carboxylic acid is $dl$-N-acetylalanine.

References Cited in the file of this patent

UNITED STATES PATENTS

| | | |
|---|---|---|
| 2,276,509 | Nabenhauer | Mar. 17, 1942 |
| 2,539,854 | Mozingo et al. | Jan. 30, 1951 |
| 2,650,938 | Gero | Sept. 1, 1953 |
| 2,797,226 | Amiard et al. | June 25, 1957 |

OTHER REFERENCES

Org. Chem., part II, Cohen, pp. 190–91, 4th ed. Longmans, Green and Co., N.Y. (1923).
Jour. Am. Chem. Soc., vol. 71, p. 3251 (1949).
Org. Chem. Karrer, 2nd Eng. ed. pages 98–99 (1946).
Org. Chem. Gilman, vol. I, pages 189–190 (1938).